No. 702,603. Patented June 17, 1902.
E. A. STOCKDALE.
BED PAN.
(Application filed Aug. 8, 1901.)
(No Model.)

Witnesses:
Linda B. Francis
A. M. Burn

Inventor.
Emily A. Stockdale

UNITED STATES PATENT OFFICE.

EMILY A. STOCKDALE, OF WASHINGTON, DISTRICT OF COLUMBIA.

BED-PAN.

SPECIFICATION forming part of Letters Patent No. 702,603, dated June 17, 1902.

Application filed August 8, 1901. Serial No. 71,395. (No model.)

*To all whom it may concern:*

Be it known that I, EMILY A. STOCKDALE, a citizen of the United States, and a resident of Washington, in the District of Columbia, have invented a new and useful Improvement in Bed-Pans, of which the following is a specification.

This invention relates to a new and useful improvement in bed-pans.

Heretofore bed-pans have been used having an irregular contour at the orifice and no provision for the comfort of the user at the periphery of the said orifice; but by my new and useful improvement I provide a semicircular orifice the periphery of which is wide and smooth, so that the same does not irritate by its sharp edges and borders the person of the user.

My invention consists of a bed-pan having its body part formed cylindrical, rising in the rear or toward the feet of the invalid and extending forwardly and downwardly toward the head of the invalid.

My invention further consists in the details pointed out in the following specification and illustrated in the accompanying drawings, of which—

Figure 1:
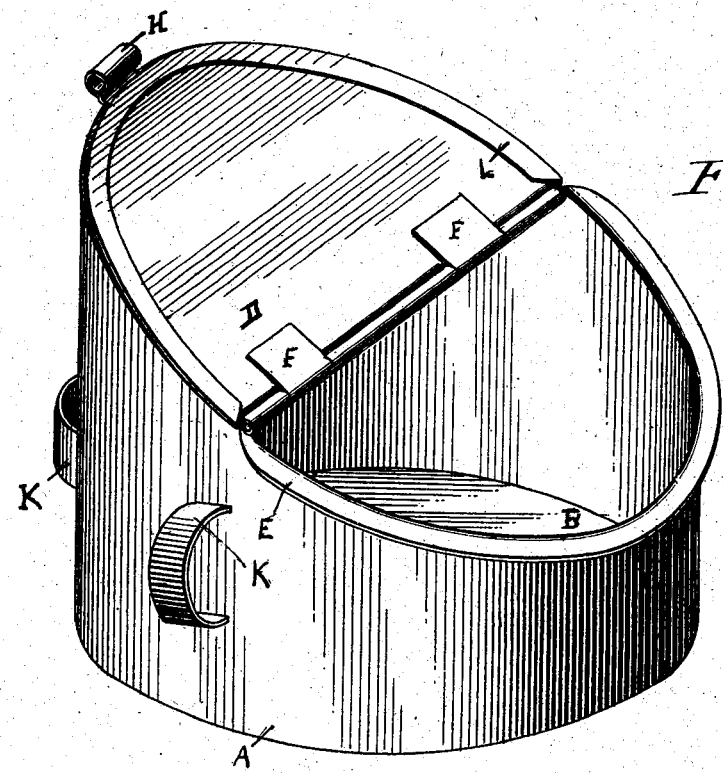
Figure 2:
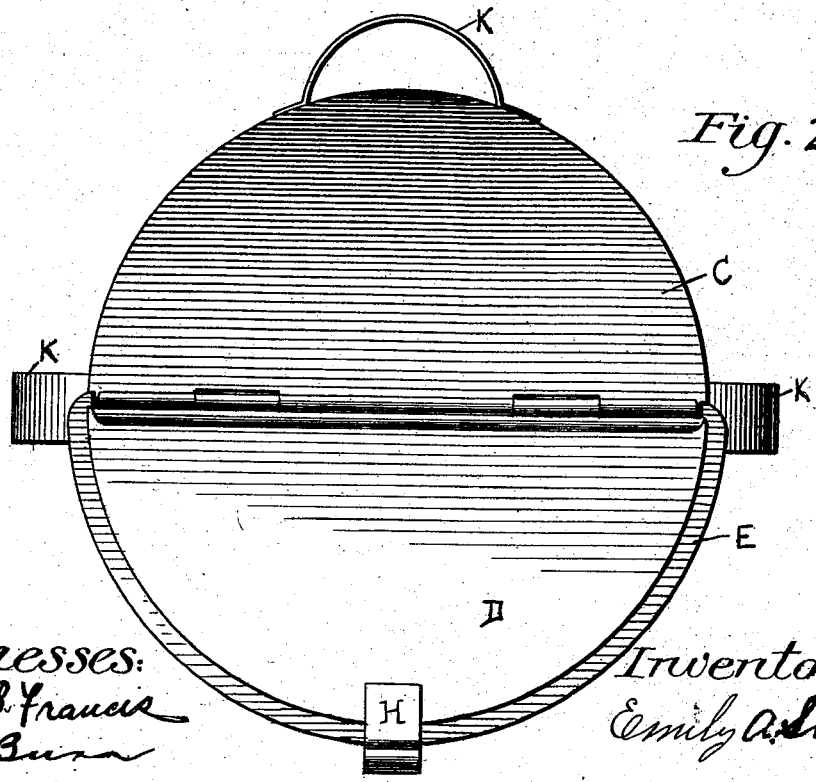

Figure 1 is a perspective view of my improved bed-pan having the lid open, and Fig. 2 is a plan view having the lid closed.

In the drawings, A represents the reservoir or the body of the bed-pan; B, the bottom thereof. The reservoir is circular in horizontal section; but the top thereof inclines downwardly and forwardly from the rear at such an angle as to suit the position of the user. Over the rear and upper section of the reservoir is the cover C, and over the forward and lower section is the lid D, which is hinged to the cover C by the hinges F F. The cover C and the lid D form a complete ellipse, so that when the lid D is folded back over the cover C both the lid and the cover will coincide. The periphery of the opening under the lid D is bent outwardly to form a flange E, which is flat and wide enough to suit the comfort of the user. At the outer side of the reservoir are three handles K K K, one at the rear and two at the sides, so that the device may be easily removed from its position under the user without spilling the contents of the reservoir. The lid D is provided with a spring-catch H, which slips over the flange E and fastens the same in its closed position.

The peculiar features of my new and improved bed-pan are that the same is provided with a top cover which while the pan is in use can be folded back to coincide with the closed side of the pan and not interfere with the comfort of the user. When the same is removed from under the user, the cover can immediately be folded down and latched, so that the contents of the pan will not spill out, and, further, the semicircular flange at the lower and forward side of the pan is such as to not irritate the body of the user, and the handles are arranged in such a position as to be easily accessible and the pan with its contents can be removed in case of an emergency.

Heretofore in the art there have been numerous bed-pans provided with covers, also pans provided with flanges for the comfort of the individual, but in no case in the art is there a pan to which the cover is attached and which can be folded back to coincide with the upper contour of the pan. When the said cover is folded down, it forms a tight covering to confine the contents of the reservoir. My bed-pan may be constructed of any material, such as tin, sheet iron or steel, or any other of the sheet metals, also of porcelain, glass, or any other siliceous material.

I do not wish to confine my invention to the exact details pointed out in this specification, but reserve the right to modify the same within the scope of the appended claims.

Having now fully described my invention, what I claim is—

1. A bed-pan consisting of a reservoir having an inclined top extending downwardly and forwardly, a cover closing the upper half of the said top, a lid hinged to said cover in such a manner that the same may be folded down on the cover in its open position.

2. A bed-pan consisting of a reservoir having a flat bottom and a substantially cylindrical wall the top edge of said wall extending downwardly and forwardly to form substantially an elliptically-shaped opening, a cover closing the upper half of the said opening, a lid hinged to the lower edge of said cover in such a manner that the same may be folded down on the cover in its open position.

3. A bed-pan consisting of a reservoir having a flat bottom and a substantially cylindrical wall the top edge of the said wall extending downwardly and forwardly to form substantially an elliptically-shaped opening; a cover closing the upper half of the said opening; a lid hinged to the lower edge of the said cover, the said lid being of such a contour that when folded down on the cover its periphery will coincide with that of the cover.

4. A bed-pan consisting of a reservoir having a flat bottom and a substantially cylindrical wall the top edge of the said wall extending downwardly and forwardly to form substantially an elliptically-shaped opening and having its lower half continued outwardly to form a flat flange; a cover closing the upper half of the said opening, a lid hinged to the lower edge of the said cover the said lid being of such a contour that when folded down on the cover its periphery will coincide with that of the cover.

5. A bed-pan consisting of a reservoir having a flat bottom and a substantially cylindrical wall the top edge of said wall extending downwardly and forwardly to form substantially an elliptically-shaped opening and having its lower half continued outwardly to form a flat flange; a cover closing the upper half of the said opening; a lid hinged to the lower edge of the said cover having its outer edge terminating in a catch to take over the flange to fasten the lid in its closed position.

6. A bed-pan consisting of a reservoir having a flat bottom and a substantially cylindrical wall the top edge of said wall extending downwardly and forwardly to form substantially an elliptically-shaped opening and having its lower half continued outwardly to form a flat flange; a cover closing the upper half of the said opening; a lid hinged to the lower edge of the said cover having its outer edge terminating in a catch to take over the flange to fasten the lid in its closed position, the said lid being of such a contour that when folded down on the cover its periphery will coincide with that of the cover.

7. A bed-pan consisting of a reservoir having a flat bottom and a substantially cylindrical wall the top edge of said wall extending downwardly and forwardly to form substantially an elliptically-shaped opening; a cover closing the upper half of said opening; a lid hinged to the lower edge of said cover said lid being of such a contour that when folded down on the cover its periphery will coincide with that of the cover, and handles attached to the outer side of the reservoir.

In testimony whereof I have signed my name in the presence of two subscribing witnesses.

EMILY A. STOCKDALE.

Witnesses:
LINDA B. FRANCIS,
A. M. BUNN.